(No Model.)

J. P. CLEAL.

CASH REGISTER AND INDICATOR.

No. 514,670.

5 Sheets—Sheet 1.

Patented Feb. 13, 1894.

Witnesses.
S. M. Brainard.
R. B. Caffray

Inventor.
Joseph P. Cleal
by Edward Rector
his atty.

(No Model.) 5 Sheets—Sheet 3.
J. P. CLEAL.
CASH REGISTER AND INDICATOR.
No. 514,670. Patented Feb. 13, 1894.

(No Model.)　　　　　　　　J. P. CLEAL.　　　　5 Sheets—Sheet 4.
CASH REGISTER AND INDICATOR.

No. 514,670.　　　　　　　　　　　Patented Feb. 13, 1894.

Witnesses.
S. M. Brainard.
R. B. Caffray

Inventor.
Joseph P. Cleal
by Edward Rector
his atty.

(No Model.) 5 Sheets—Sheet 5.
J. P. CLEAL.
CASH REGISTER AND INDICATOR.
No. 514,670. Patented Feb. 13, 1894.
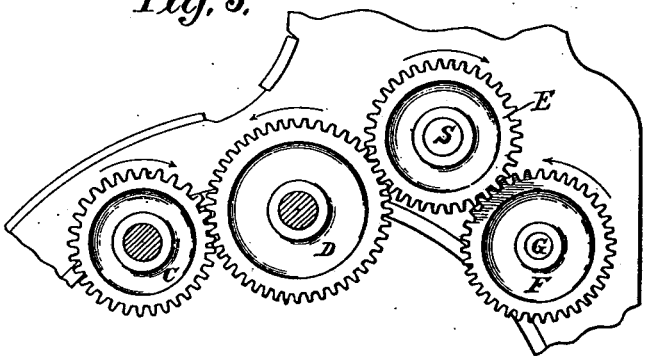
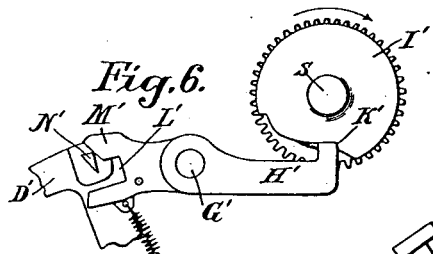
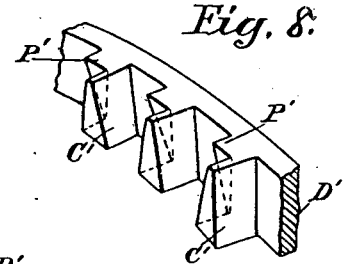
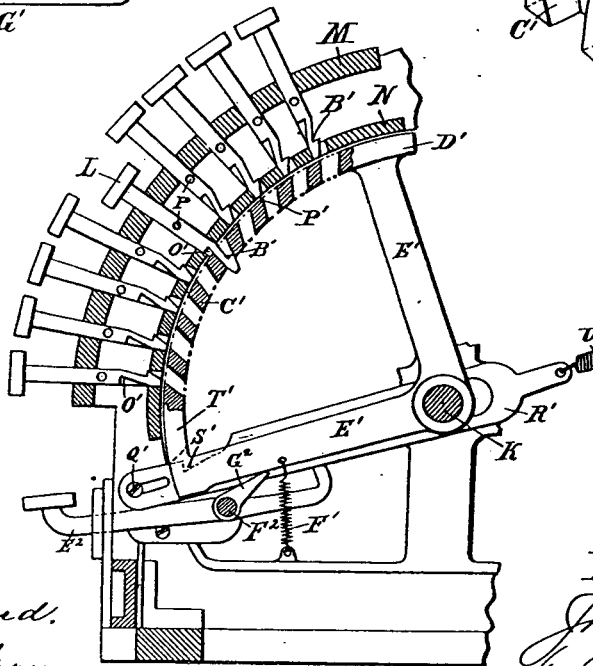

UNITED STATES PATENT OFFICE.

JOSEPH P. CLEAL, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 514,670, dated February 13, 1894.

Application filed October 14, 1893. Serial No. 488,130. (No model.)

*To all whom it may concern:*

Be it known that I, JOSEPH P. CLEAL, a citizen of the United States, residing at Dayton, in the county of Montgomery and State of Ohio, have invented a certain new and useful Improvement in Cash Registers and Indicators, of which the following is a description, reference being had to the accompanying drawings, forming part of this specification.

My invention relates to improvements upon the machine shown and described in Letters Patent No. 464,294, granted Hugo Cock December 1, 1891. Said machine has also been illustrated and described in various subsequent patents and applications of said Cook and others covering improvements upon and modifications of the machine, so that a detailed description of that part of the machine which is old will not be necessary here.

Figure 1:
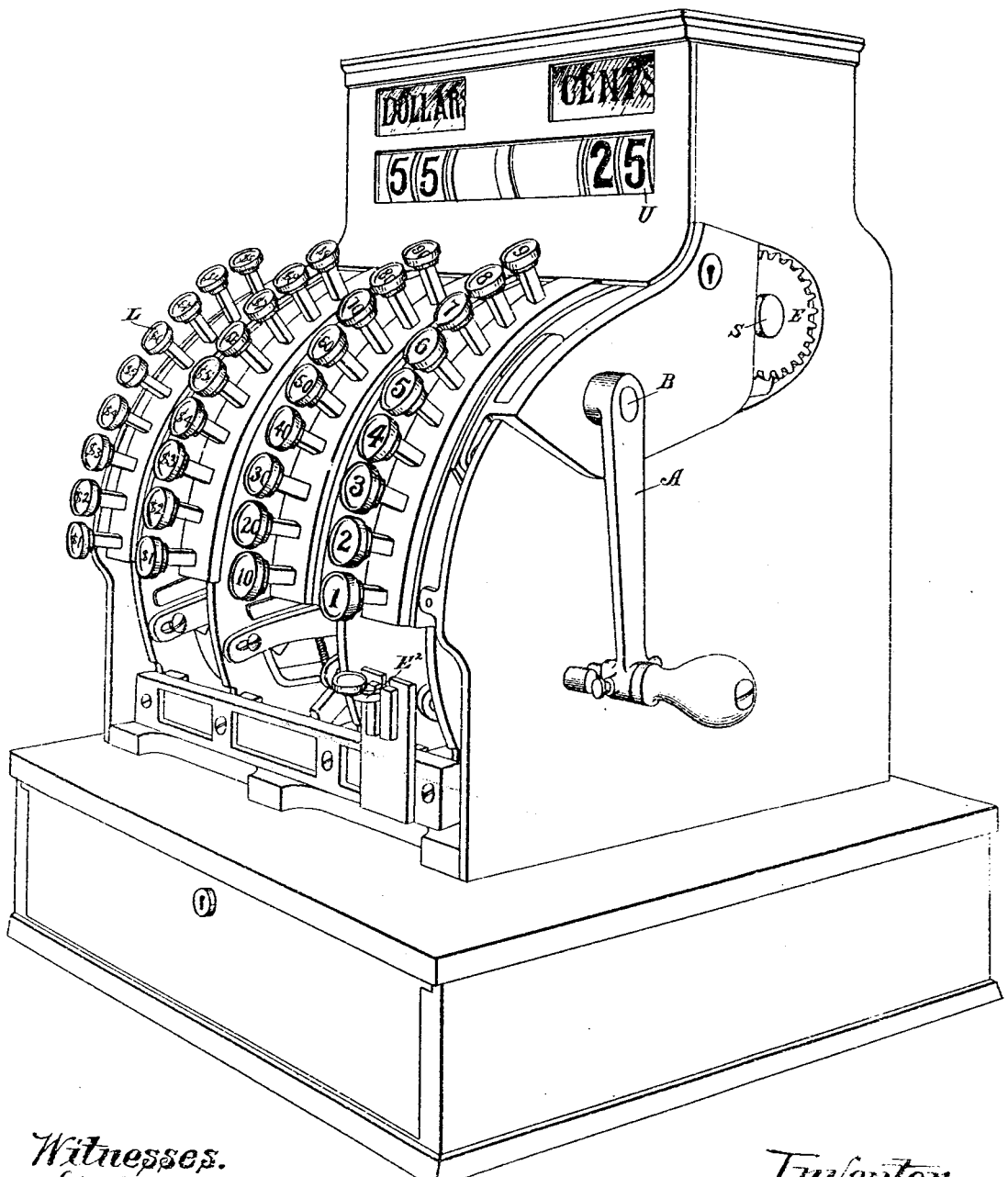
Figure 2:
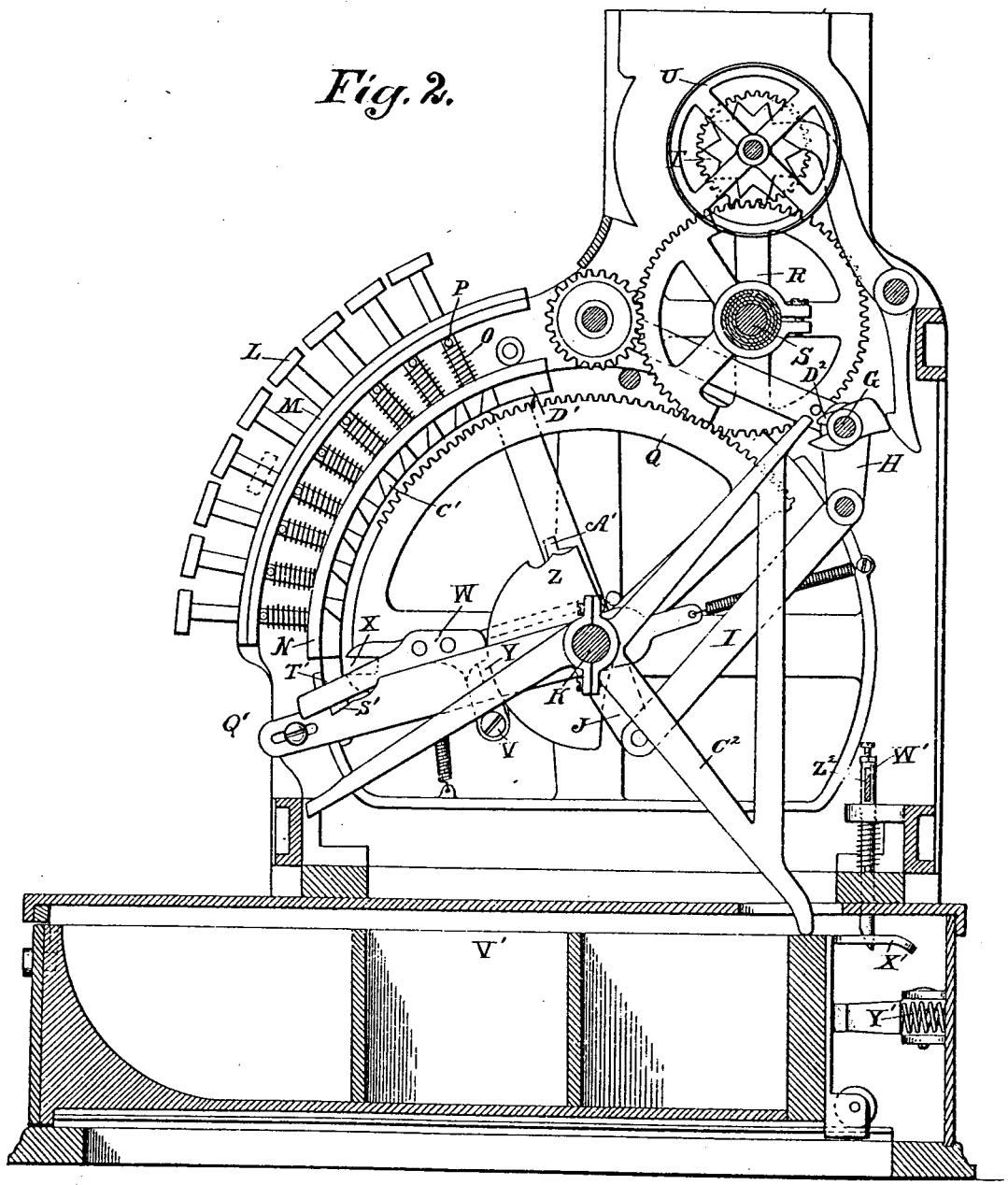
Figure 3:
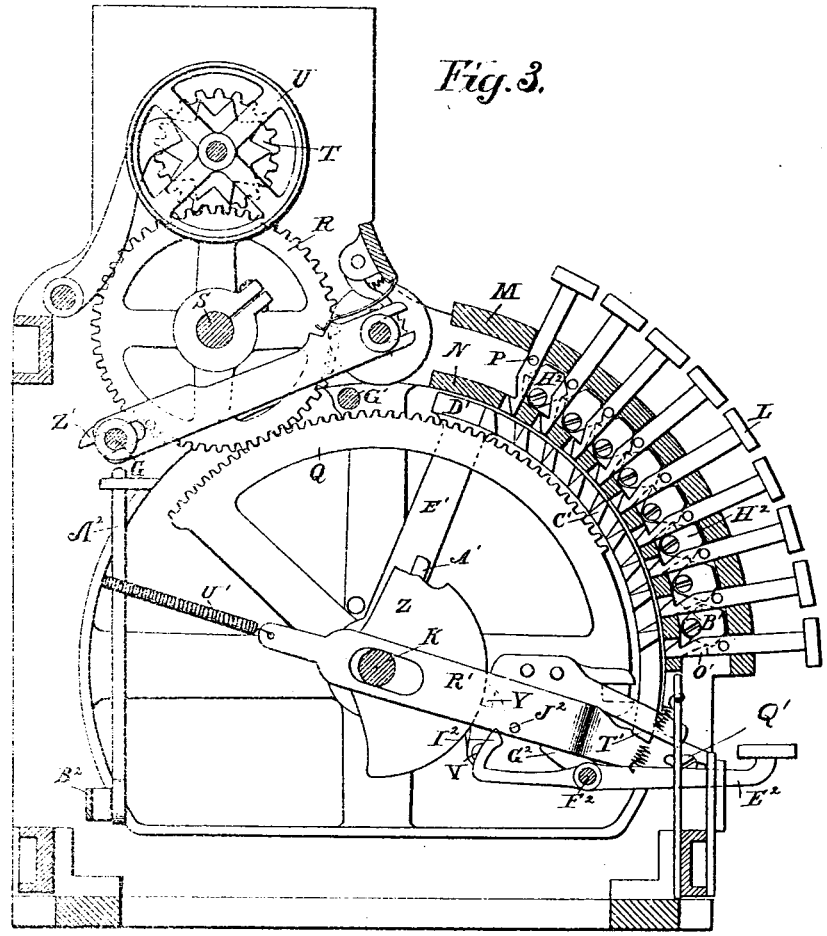
Figure 4:
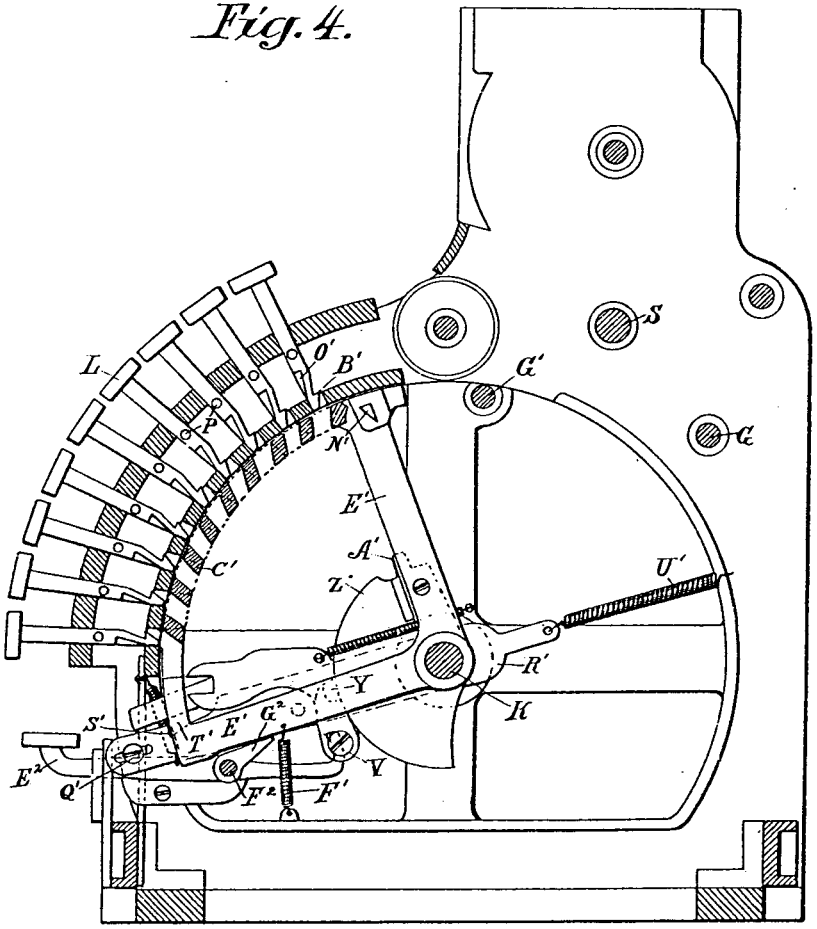

In the accompanying drawings Figure 1 is a perspective view of the complete machine, including the base or drawer-compartment containing the money-drawer, with part of the casing removed to expose the mechanism within; Fig. 2 a vertical cross-section of the machine between the second and third banks of keys, looking toward the left of the machine; Fig. 3 a vertical cross-section of the machine (without the drawer-compartment) between the first and second rows of keys, looking toward the right of the machine; Fig. 4 a corresponding view in a plane immediately to the right of the right hand row of keys and looking toward the left of the machine; Fig. 5 a detail view of the gearing connecting the operating handle and driving shaft; Fig. 6 a detail view of the locking device controlled by the keys; Fig. 7 a detail vertical section corresponding to Fig. 4, with one of the operating keys partially depressed; and Fig. 8 an enlarged perspective detail of part of one of the detent plates.

The same letters of reference are used to indicate identical parts in all the figures.

The operating handle A of the machine is fast upon a short shaft B which is geared by a train of gears C D E F, Fig. 5, to a rotary shaft G extending entirely across the machine and which may be called the driving shaft thereof. The shaft G has interposed in it near its left hand end a crank H, Fig. 2, to which is connected the upper rear end of a link I which is pivoted at its lower forward end to an arm J fast upon a central rock-shaft K. At each complete revolution of the operating handle A the shaft G is given a complete revolution and the shaft K oscillated forward and backward throughout its limit of movement.

The numbered keys L, in this instance four banks or rows of them each containing nine keys, are mounted radially to the shaft K in segmental guide-plates M N and are surrounded between said plates by coiled springs O, Fig. 2, which bear at their inner ends against the plate N and at their outer ends against pins P passed through the stems of the keys, thereby pressing the keys outward and yieldingly holding them in normal position.

Loosely mounted upon the rock-shaft K, one approximately in line with each of the rows of keys, are four gear-toothed sectors Q which mesh with gear-wheels R (or segments thereof) loosely mounted upon a shaft S, while the wheels R mesh with smaller gears T fast upon the sides of the numbered indicator wheels U. Pivoted to a pendent extension of each sector Q, at V, is an elbow-shaped latch-plate W provided with an open mouth X at its outer end and with a recess Y upon its rear side. Fast upon the rock-shaft K are four cam-plates Z, one beside each sector Q, and each cam-plate has fast upon its side at its upper end a coupling lug A' adapted to co-operate with the recess Y in the latch W. Each of the keys L is provided near its inner end with a notch B', Figs. 3 and 4, which, when the key is pressed inward, is adapted to be engaged by a beveled detent C' upon the side of an oscillating detent-plate D' and held in its inner position against the stress of its spring. The detent-plate D' is curved concentrically to the shaft K and loosely hung thereon by means of arms E' connected to or formed integral with its opposite ends. A spring F' connected to the lower one of its arms, Fig. 4, pulls it downward and yieldingly holds it in the normal position shown. When one of the keys is pressed inward its beveled inner end rides against the beveled surface of the adjacent detent C' and lifts the plate D', against the stress of the spring F', until the notch B' in the key comes opposite the detent, whereupon the spring F' will pull the plate D' back to normal position and engage the detent with the notch in the key. The key is thus locked in its inner position until the plate D' is lifted again to release it.

The mode of operation of the parts thus far referred to may be briefly described as follows: If one of the keys L be pressed inward and caught and held by its detent, and the operating handle and driving shaft be then given a complete revolution, the coupling lug A' upon the cam-plate Z will at the forward oscillation of the rock-shaft K engage the recess Y in the latch-plate W and thereby couple the shaft K to the sector Q, so that during the backward oscillation of said shaft the sector will be carried with it until the outer end of the latch-plate W engages the inner end of the key which has been pressed inward, whereupon the mouth X of the latch-plate will embrace the end of the key, the latch-plate rock upon its pivot V until its recess Y is disengaged from the lug A', and the sector Q be arrested, while the shaft K, plate Z and lug A' will move on backward to normal position alone. When the sectors Q stand in the position shown in the drawings the indicator wheels U stand at zero or initial position, and the adjustment of the parts is such that when the sector Q in its backward movement is arrested by the inner end of any operated key the number upon the indicator which corresponds to the value of such key will have been brought to the indicating point and the registering mechanism (not shown) will have been actuated to add the value of such key to the amount theretofore registered.

It is desirable that means be provided for preventing operation of the machine except when one of the keys has been pressed inward and caught by its detent-plate, so that the value thereof will be indicated and registered when the handle is turned. To that end the Cook patent heretofore referred to illustrated and described a locking device for the operating handle, controlled by and co-operating with the keys in such manner that the normally locked handle would be unlocked by pressing in any one of the keys in either bank, and would become automatically relocked at the end of its revolution. I have illustrated a similar device in Fig. 6 of the accompanying drawings.

Fast upon the outer end of a rock-shaft G' is a lever H' whose upturned rear end bears against the periphery of a disk I' fast upon the shaft S which carries the gear E. The disk I' has one portion of its periphery cut away, forming an abrupt shoulder at K'. The upturned rear end of the lever H' normally stands in the path of this shoulder K', so that until the front end of the lever is lifted and its rear end thrown downward the shaft S and gear E, and consequently the operating handle A, are locked from movement. The front end of the lever H' is provided with an open mouth or recess L' whose upper jaw M' has a beveled under surface against which normally bears a lug N' projecting laterally from the side of the upper end of the detent-plate D', Fig. 4. When the plate D' is lifted in the manner heretofore described by pressing any one of the keys L the lug N' will ride against the beveled under side of the jaw M' and lift the front end of the lever H' and depress its rear end, thereby carrying the latter out of the path of the shoulder K' upon the disk I' and unlocking the operating handle.

The operation of the machine thus far described, including the locking mechanism controlled by the keys, is substantially the same as that shown and described in the Cook patent before referred to, and the first feature of my invention relates to the keys and detent-plate and their co-operation with the locking mechanism. Under the construction heretofore employed it was possible to press one of the keys inward just far enough to release the operating handle, without pressing it far enough to cause its notch to be caught by the co-operating detent, so that upon releasing the key its spring would throw it outward to normal position and the revolution of the operating handle would thereupon cause the sector corresponding to such row of keys to be carried backward by the rock-shaft K to its limit of movement, thereby turning the indicator to indicate nine, the highest amount that could be indicated, and causing the same amount to be added upon the register, no matter which key had been pressed.

It is the object of this part of my invention to provide means for locking the partially depressed key from outward movement before it has been pressed far enough to release the operating handle, and to also automatically lock all of the other keys in the same row, so that when any key is pressed inward far enough to release the handle it can not be withdrawn nor can any other key in the row be operated until such key has been pressed inward to its full extent and the operating handle given a complete revolution, to indicate and register its value, and to lift the detent-plate and release such key. (The detent-plates are all lifted at the end of each operation of the machine, to release the operated keys and permit their springs to throw them outward to normal position, by means which is illustrated and described in detail in the Cook patent before referred to and which therefore needs no explanation here.) The keys L are provided, in addition to the notches B' which co-operate with the detents C', with notches or recesses O' upon their opposite sides from the notches B'. These notches are arranged to co-operate with locking projections P' upon the detents C', the detents and projections being of the shape more particularly shown in Fig. 8. When any key is pressed inward its inner end rides against the beveled surface of the detent C' immediately above or in rear of it and thereby moves the detent-plate upward and rearward and this movement of the plate carries the projection P' of the detent which is immediately below or in front of the key into the notch or recess O' of the key. The key is thus confined between the two adjacent detents, its beveled inner end fitting against the beveled surface of the one detent and the projection P' of the opposite detent fitting in its notch O, as seen in Fig. 7. If the detent-plate be now maintained in this position it will be seen that the key cannot be withdrawn, the engagement of the projection P' with the inclined wall or bottom of the notch O' of the key preventing outward movement of the latter. It will also be seen that all of the remaining keys in the row are locked from inward movement by the outer surfaces of the projections P' of the adjacent detents, the upward and rearward movement of the detent-plate D' having carried such projections immediately beneath the inner ends of such keys. Now, by the means to be described, the detent-plate D' is caught and held in the position shown in Fig. 7 as soon as it is moved thereto by the partial depression of any key in the row, so that such key cannot be withdrawn nor any other key pressed in, and the only thing possible is to fully depress the partially depressed key and operate the machine to indicate and register its value.

Mounted by elongated slots upon the shaft K and upon a screw stud Q', Figs. 3 and 4, is a latch-bar R' provided in its upper edge near its front end with a notch S' in which fits the beveled lower end of a lug T' upon the detent-plate D'. A spring U' connected to the rear end of the latch-bar R' tends to pull the latter rearward, but the engagement of the lug T' with the notch S' prevents such movement of the bar. When any one of the keys is pressed inward to the position shown in Fig. 7, and the detent plate D' lifted, its lug T' will be carried out of the notch S', whereupon the spring U' will pull the latch-bar R' rearward and carry the shoulder formed by the notch S' beneath the lug T', thereby supporting the detent plate D' in the position shown and preventing return of it to normal position. The partially depressed key is therefore held locked, and depression of any of the other keys will be prevented until the latch-bar R' is moved forward to its normal position and the detent-plate D' returned to its normal position by its spring F'. (The latch-bar R' is moved forward to normal position during the latter part of each operation of the machine, by means which has been illustrated and described in detail in the Cook patent before referred to and which it is thought unnecessary to explain here.) Now, the adjustment of the parts is such that the detent-plate D' will be lifted far enough to release the latch-bar R' before its lug N', Fig. 6, has moved the lever H' far enough to unlock the operating handle, so that the partially depressed key will be locked in its displaced position, as in Fig. 7, before the operating handle is released, and it will therefore be impossible to so manipulate any one of the keys as to release the operating handle and then withdraw the key before the handle is revolved.

Under the construction illustrated in the drawings the notches O' are cut simply in the sides of the keys L and the projections P' upon the detents C' are only wide enough to correspond to the width of the notches, but it will be understood that by cutting the notches O' the full width or thickness of the keys it would be unnecessary to make the detents and their projections of the irregular shape shown and they could be made of the shape indicated by the section lines in Figs. 4 and 7, having simply parallel beveled sides and parallel ends.

For the purpose of lifting the detent-plate D' and unlocking the operating handle, without depressing any key, as for instance where it is desired to turn the handle simply for the purpose of opening the cash-drawer to make change or otherwise, there is provided a special key-lever $E^2$, Figs. 1, 3, 4 and 7, which is fast upon a rock-shaft $F^2$ which has secured upon it an arm $G^2$ bearing against the under side of the lower arm E' of the detent-plate D'. Whenever the front end of the lever $E^2$ is depressed the shaft $F^2$ will be rocked and the arm $G^2$ will lift the detent-plate and unlock the operating handle. The lever $E^2$, shaft $F^2$ and arm $G^2$ are also intended to be used as a key-releasing device, in which event the shaft will be extended entirely across the machine and be provided with four of the arms $G^2$, one beneath each detent-plate D'. For such purpose, also, the lever $E^2$ is extended rearwardly of the shaft $F^2$ and its rear end is bent upwardly to form a cam $I^2$ adapted to co-operate with a pin $J^2$ projecting laterally from the side of the latch-bar R', Fig. 3. This rearward extension of the lever $E^2$ could as well be a separate arm fast upon the shaft $F^2$, and there would be three other similar arms fast upon said shaft, one beside each latch-bar R' and adapted to co-operate with its pin $J^2$. Now, with the parts in the position shown in Fig. 7, or with one of the operating keys fully depressed, if it be desired to release such key and depress another one before the operating handle is turned, as where the wrong key has been depressed by mistake, the front end of the lever $E^2$ will be pressed downward. This will cause all of the detent-plates D' to be lifted, but this alone would not release any partially or wholly depressed keys, for the reason that when the lever $E^2$ was released the detent-plates D' could not return fully to normal position but would be caught upon the latch-bars R', as in Fig. 7, and the keys held from outward movement by the locking projection P'. It is therefore necessary that the latch-bars R' be moved forward by the depression of the lever $E^2$, so that the detent-plates can drop into the notches $S'$, and it is for this purpose that the cams $I^2$ and pins $J^2$ are employed. When the lever $E^2$ is depressed the cams $I^2$ will engage the rear sides of the pins $J^2$ and force the bars $R'$ forward as the cams pass the pins, but inasmuch as the arms $G^2$ at this time lift all of the detent-plates the bars $R'$ will not be caught and held in forward position by the lugs $T'$ upon the lower ends of such plates. When the lever $E^2$ is released, however, and the cams $I^2$ move downward to normal position they will ride over the pins $J^2$ and force the bars $R'$ forward again, and at this time the arms $G^2$ will have permitted the plates $D'$ to have moved downward far enough for their lugs $T'$ to engage the notches $S'$ and hold the bars $R'$ in their normal forward positions.

For the purpose of preventing the simultaneous operation of two or more keys in the same row there is provided a series of pivoted stop-plates $H^2$ beside each row of keys, Fig. 3, which plates co-operate with the laterally projecting ends of the pins $P$ before described. When a single key is pressed inward its pin simply spreads the adjacent plates apart and passes between them, but when it is attempted to press two keys at once their pins become locked upon the intermediate plate or plates.

The next feature of my invention relates to means for preventing operation of the machine while the money-drawer stands open. This drawer $V'$ is located within the usual compartment in the base of the machine, Fig. 2, and when in closed position is locked by a spring-pressed bolt $W'$ engaging a locking plate $X'$ secured to the rear side of the drawer. When the bolt is lifted and the drawer released the drawer is thrown open by a spring $Y'$ secured in the compartment behind it. The bolt is lifted to release the drawer at each operation of the machine by means of a cam $Z'$ upon the shaft $G$, Fig. 3, which cam bears upon the rear end of a vertically guided rod $A^2$ whose lower end is connected to one end of a lever $B^2$ which passes at its opposite end through a slot in the upper end of the bolt $W'$, Fig. 2. At each revolution of the shaft $G$ the cam $Z'$ depresses the rod $A^2$ and rocks the lever $B^2$ and lifts the bolt $W'$ and releases the drawer. Hung upon the central rock-shaft $K$, Fig. 2, is a three-armed lever $C^2$ whose upper rear arm projects into proximity to the shaft $G$ and whose lower rear arm extends down into the drawer-compartment. Fast upon the shaft $G$ is a cam $D^2$ which co-operates with the end of the upper arm of this lever. When the drawer is in its closed position the lower arm of the lever rests upon the rear wall of the drawer and the lever is held in the position shown in Fig. 2, with its upper arm out of the path of the cam $D^2$, but when the drawer is opened and its rear wall withdrawn from the lower arm of the lever the latter will oscillate forward and the upper end of its upper arm will move into the path of the cam $D^2$, so that when the latter arrives at normal position, Fig. 2, it can move no farther until the drawer is closed and the lever $C^2$ lifted to its normal position. The forwardly extending arm of the lever is adapted to be engaged by the bolt of any suitable lock secured to the casing or framework, so that when the plate is thrown downward it will engage the forward end of this arm and maintain the lever in its normal position whether the drawer be open or closed. In this manner the lever may be thrown and temporarily maintained out of locking operation whenever desired.

Having thus fully described my invention, I claim—

1. In a cash register, the combination, with a series of keys $L$ provided upon one side with the notches $B'$ and upon their opposite sides with the beveled or cam surfaces such as formed by the notches $O'$, of the oscillatory detent-plate $D'$ provided with the detents $C'$ co-operating with the notches $B'$ of the keys and with the locking projections $P'$ co-operating with the beveled surfaces upon the opposite sides of the keys, substantially as described.

2. In a cash register, the combination, with the curved oscillatory detent-plate $D'$ loosely mounted upon a shaft $K$ and provided with the detents $C'$ and locking projections $P'$, of the series of keys $L$ mounted radially to the shaft $K$ and provided with the notches $B'$ co-operating with the detents $C'$ and with the notches $O'$ co-operating with the projections $P'$, substantially as described.

3. In a cash register, the combination of the series of keys $L$ provided with the notches $B'$ $O'$, the oscillatory detent-plate $D'$ provided with the detents $C'$ and locking projections $P'$ co-operating respectively with the notches $B'$ and $O'$ of the keys, and the latch-bar $R'$ co-operating with the detent-plate $D'$ substantially as described.

4. In a cash register, the combination of the series of keys $L$ provided with the notches $B'$ $O'$, the oscillatory detent-plate $D'$, provided with the detents $C'$ and locking projections $P'$, the latch-bar $R'$ co-operating with the detent-plate $D'$ and provided with the pin $J^2$, and a cam, as $I^2$, co-operating with the pin $J^2$, for the purpose described.

5. The combination of the series of keys $L$ provided with the notches $B'$ $O'$, the oscillatory detent-plate $D'$ provided with the detents $C'$ and locking projections $P'$, the latch-bar $R'$ provided with the pins $J^2$, the rock-shaft $F^2$ carrying the arm $G^2$ co-operating with the detent-plate and the cam $I^2$ co-operating with the pin $J^2$, and means, as the lever $E^2$, for rocking the shaft $F^2$, substantially as and for the purpose described.

6. In a cash register, the combination, with the money-drawer $V'$ and its locking mechanism, of the rotary shaft $G$ co-operating with such mechanism, and the lever $C^2$ co-operating with the drawer and with a projection $D^2$ upon said shaft in the manner and for the purpose described.

7. In a cash register, the combination, with the money-drawer V' and its locking mechanism, of the rotary driving shaft G, and the three-armed lever $C^2$ hung upon the shaft K, one of its arms co-operating with a projection $D^2$ upon the shaft G, another with the money-drawer, and the third extending forward into position to be engaged by the bolt of a lock, substantially as and for the purpose described.

JOSEPH P. CLEAL.

Witnesses:
PEARL N. SIGLER,
JOHN M. BUCKLES.